No. 644,524. Patented Feb. 27, 1900.
A. LIST.
ATTACHMENT FOR PIPES.
(Application filed Mar. 1, 1899.)
(No Model.)
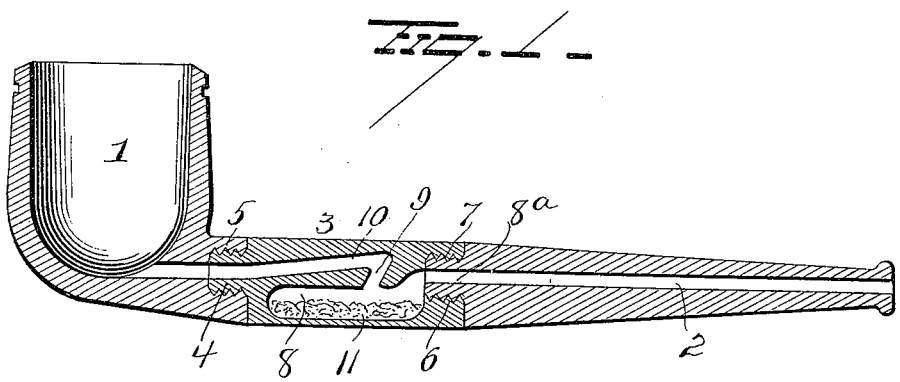
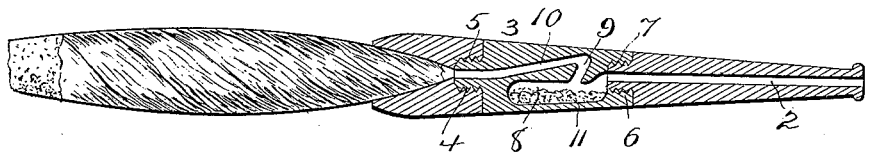
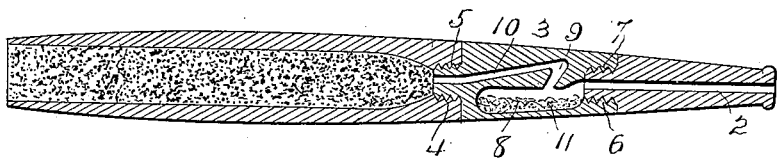
WITNESSES
E. J. Nottingham
G. F. Downing
INVENTOR
A. List
By H. A. Seymour
Attorney

UNITED STATES PATENT OFFICE.

ADOLPH LIST, OF CAPE GIRARDEAU, MISSOURI, ASSIGNOR OF ONE-HALF TO WILLIAM H. COERVER, OF SAME PLACE.

ATTACHMENT FOR PIPES.

SPECIFICATION forming part of Letters Patent No. 644,524, dated February 27, 1900.

Application filed March 1, 1899. Serial No. 707,364. (No model.)

*To all whom it may concern:*

Be it known that I, ADOLPH LIST, a resident of Cape Girardeau, in the county of Cape Girardeau and State of Missouri, have invented certain new and useful Improvements in Attachments for Pipes; and I do hereby declare the following to be a full, clear, and exact description of the invention, such as will enable others skilled in the art to which it appertains to make and use the same.

My invention relates to an improvement in attachments for smokers' pipes, cigar or cigarette holders, or imitation cigars, one object of the invention being to provide simple means which will operate effectually to prevent nicotine and sediment from passing into the smoker's mouth and to keep the smoke always cool and free from tobacco-dust.

A further object is to provide a section of pipe-stem having a nicotine-collecting chamber therein and which can be employed on any ordinary pipe-stem and which can be readily interchanged from one pipe or like device to another.

A further object is to provided a nicotine-detaining section of a pipe-stem which will be extremely simple in construction, cheap to manufacture, and most useful and healthful when in operation.

With these objects in view the invention consists in certain novel features of construction and combinations and arrangements of parts, as will be more fully hereinafter described, and pointed out in the claims.

In the accompanying drawings, Figure 1 is a view in section, illustrating my improvements. Fig. 2 is a view showing my improved attachment attached to a cigar-holder, and Fig. 3 is a view showing the attachment on an imitation cigar.

1 represents the bowl of an ordinary pipe, 2 a stem therefor, and 3 my improved attachment disposed between the stem and bowl. The attachment or section 3 is provided with a screw-threaded nipple 4 on one end, adapted to be screwed into the socket 5 in the shank of the bowl 1, and the section 3 is provided at its other end with a screw-threaded socket 6 for the reception of a nipple 7 on the stem 2.

The section 3 is provided in its lower portion with a receptacle or chamber 8, which communicates with the passage $8^a$ in the stem, as shown. A duct or passage 9 extends upward from the receptacle or chamber 8 at a point near the stem or mouthpiece and is preferably inclined toward the mouthpiece or stem and communicates at its upper end with a duct or passage 10, extending forwardly and downwardly and extending through the nipple 4, where it communicates with the duct or channel in the shank of the bowl-section. The duct 10 forms with the duct 9 an angular channel or passage, less than a right angle, and thus forms a stop for any dust or nicotine and compels the smoke to pass down into the chamber or receptacle 8 before it reaches the smoker. I prefer to place a small quantity of absorbent cotton 11 in the receptacle or chamber 8, either with or without some drug, such as tannin, to more effectually detain the nicotine.

It will be seen that the smoke passes up the passage 10, turns the angle into duct or passage 9, and enters the chamber 8 through the absorbent cotton therein and then passes into the stem to the smoker's mouth, thus insuring a thorough cleansing and cooling of the smoke before reaching the smoker.

My improved attachment may be used in connection with any cigar or cigarette holder, as clearly shown in Fig. 2, or it may form part of an imitation cigar, as shown in Fig. 3. In fact, it will be readily seen that my improved attachment may be applied as a section of any pipe or similar device.

Various slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. A nicotine-trap for smoking devices consisting of a body having a chamber therein open at one end and closed at the other, the open end communicating with a threaded portion for the reception of a stem of ordinary construction, said body having a longitudinal duct over the chamber therein and communicating at one end with a downwardly and forwardly extending duct, the other end of which communicates with the top of the chamber, said body having a nipple at one end through which the longitudinal duct extends, said nipple threaded for the reception of a tobacco-holder of ordinary construction.

2. The combination with a smoking device having a holder for tobacco and a stem of common construction, of an independent attachment removably inserted between the tobacco-holder and the stem, said attachment having a chamber therein communicating at one end with the duct in the stem, said attachment also having an angular or hook-shaped duct with its downwardly-extending portion communicating with the top of said chamber at a point removed from the inner end thereof and its longitudinally-disposed portion communicating with the tobacco-holder.

3. The combination with a bowl having a shank projecting therefrom at an angle, and a stem, of an independent attachment removably connected at its respective ends to the stem and to the shank of the bowl, said attachment having a chamber therein communicating at one end with the duct in the stem and also having an angular duct communicating at one end with the duct in the shank of the bowl and extending to a point in proximity to the inner end of said chamber, the shorter arm of said angular duct extending downwardly and inclining forwardly to the chamber at a point removed from the inner end thereof.

In testimony whereof I have signed this specification in the presence of two subscribing witnesses.

ADOLPH LIST.

Witnesses:
MARTIN SCHAEFER,
PHILLIPP KLINGEMANN.